United States Patent
Yi et al.

(10) Patent No.: US 10,554,249 B2
(45) Date of Patent: Feb. 4, 2020

(54) METHOD AND APPARATUS FOR HANDLING FREQUENCY RETUNING FOR MACHINE-TYPE COMMUNICATION USER EQUIPMENT IN WIRELESS COMMUNICATION SYSTEM

(71) Applicant: LG ELECTRONICS INC., Seoul (KR)

(72) Inventors: Yunjung Yi, Seoul (KR); Daesung Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/771,711

(22) PCT Filed: Nov. 4, 2016

(86) PCT No.: PCT/KR2016/012648
§ 371 (c)(1),
(2) Date: Apr. 27, 2018

(87) PCT Pub. No.: WO2017/078458
PCT Pub. Date: May 11, 2017

(65) Prior Publication Data
US 2018/0367185 A1  Dec. 20, 2018

Related U.S. Application Data

(60) Provisional application No. 62/251,053, filed on Nov. 4, 2015, provisional application No. 62/252,384, filed (Continued)

(51) Int. Cl.
*H04B 1/7143* (2011.01)
*H04L 5/00* (2006.01)
(Continued)

(52) U.S. Cl.
CPC ......... *H04B 1/7143* (2013.01); *H04L 5/0012* (2013.01); *H04L 5/0053* (2013.01);
(Continued)

(58) Field of Classification Search
CPC .................................................. H04B 1/7143
See application file for complete search history.

(56) References Cited

U.S. PATENT DOCUMENTS

2014/0169319 A1    6/2014 Yang et al.
2016/0226639 A1*   8/2016 Xiong ................... H04L 5/0053
2016/0338088 A1*  11/2016 Fakoorian ......... H04W 72/1263

OTHER PUBLICATIONS

Catt, "PUCCH resource allocation and frequency hopping for Rel-13 MTC UEs", R1-155171, 3GPP TSG RAN WG1 Meeting #82bis, Malmo, Sweden, Oct. 5-9, 2015, 4 pages.
(Continued)

*Primary Examiner* — John D Blanton
(74) *Attorney, Agent, or Firm* — Birch, Stewart, Kolasch & Birch, LLP

(57) ABSTRACT

A method and apparatus for transmitting a physical uplink control channel (PUCCH) in a wireless communication system is provided. A machine-type communication (MTC) user equipment (UE) determines a PUCCH resource in a plurality of subframes. The PUCCH resource is subject to frequency hopping across the plurality of subframes regardless of a number of repetition of PUCCH transmission and a starting subframe of the PUCCH transmission. The UE transmits the PUCCH by using the PUCCH resource to a network.

16 Claims, 9 Drawing Sheets

Related U.S. Application Data on Nov. 6, 2015, provisional application No. 62/256,733, filed on Nov. 18, 2015.

(51) Int. Cl.
  *H04W 4/70* (2018.01)
  *H04W 72/04* (2009.01)
(52) U.S. Cl.
  CPC .......... *H04W 4/70* (2018.02); *H04W 72/0413* (2013.01); *H04W 72/0446* (2013.01)

(56) References Cited

OTHER PUBLICATIONS

Mediatek Inc., "Discussion on narrow band PUCCH design for Rel-13 MTC", R1-154718, 3GPP TSG-RAN WG1 Meeting #82, Beijing, China, Aug. 24-28, 2015, 4 pages.
Nokia Networks, "PUCCH resource allocation for MTC", R1-155142, 3GPP TSG-RAN WG1 Meeting #82bis, Malmo, Sweded, Oct. 5-9, 2015, 4 pages.
Samsung, "Frequency Hopping for Rel-13 Low Cost UEs", R1-155423, 3GPP TSG RAN WG1 Meeting #82bis, Malmo, Sweden, Oct. 5-9, 2015, 3 pages.

\* cited by examiner

[Fig. 1]
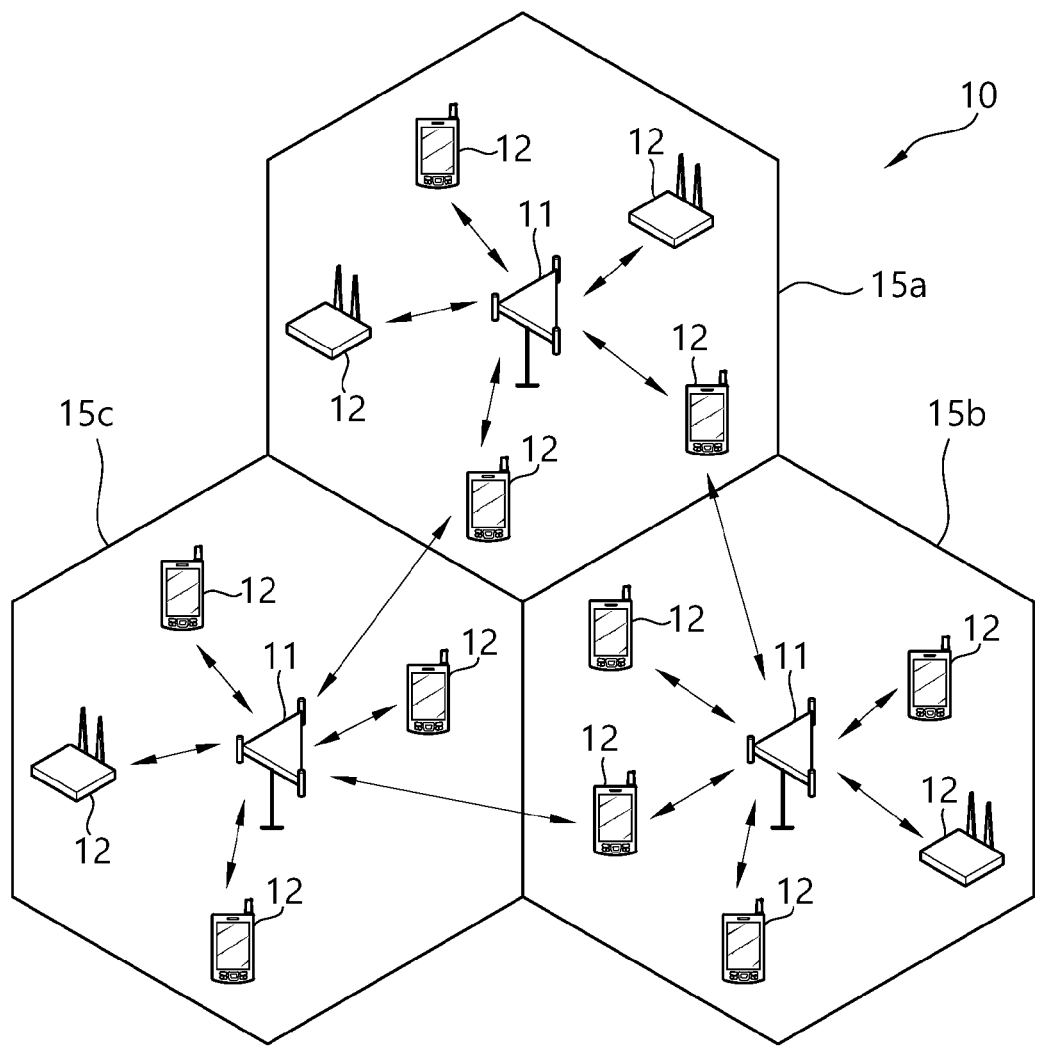
[Fig. 2]
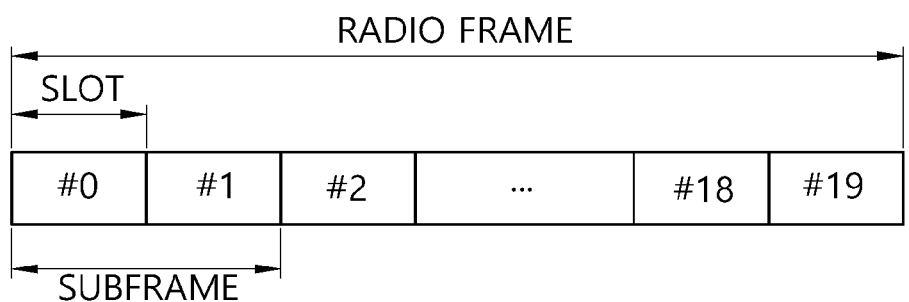

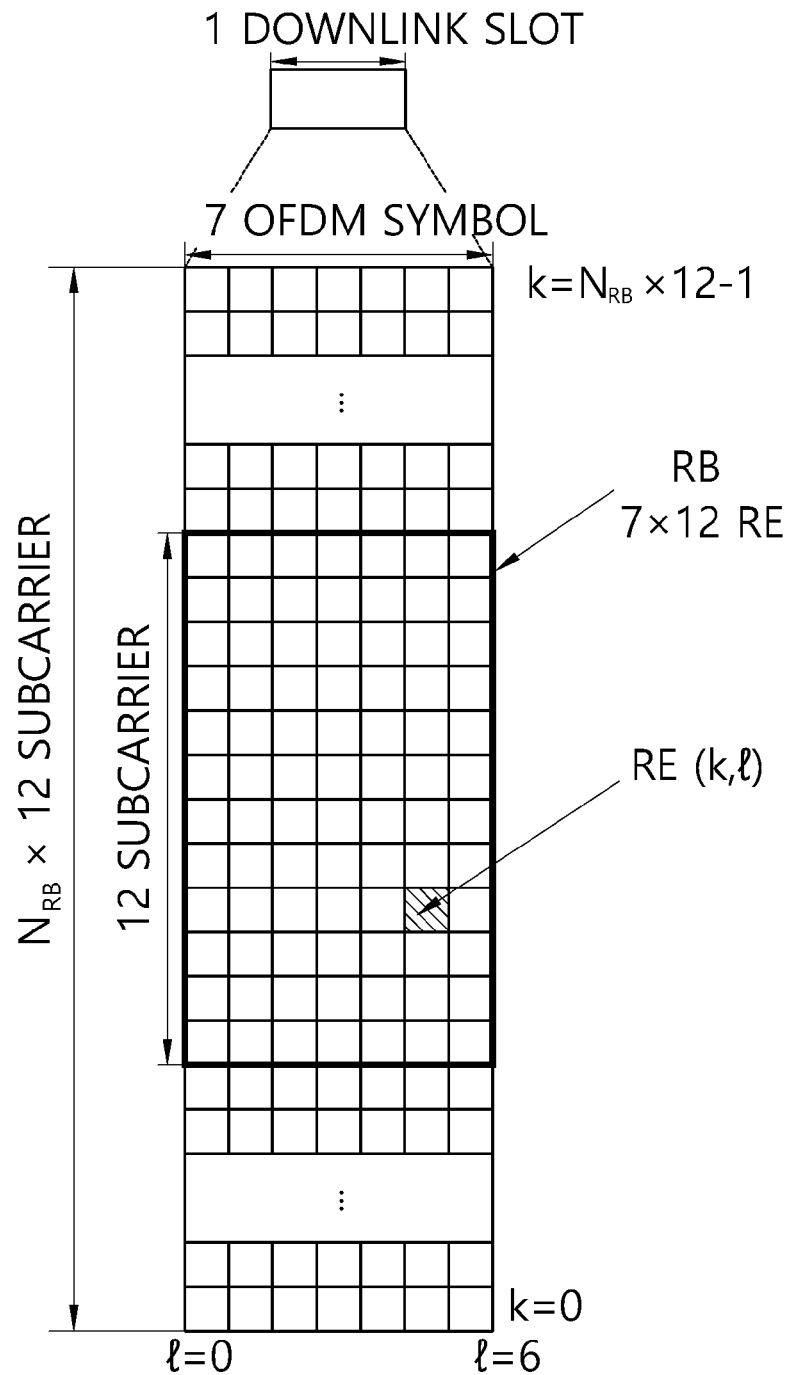
[Fig. 3]

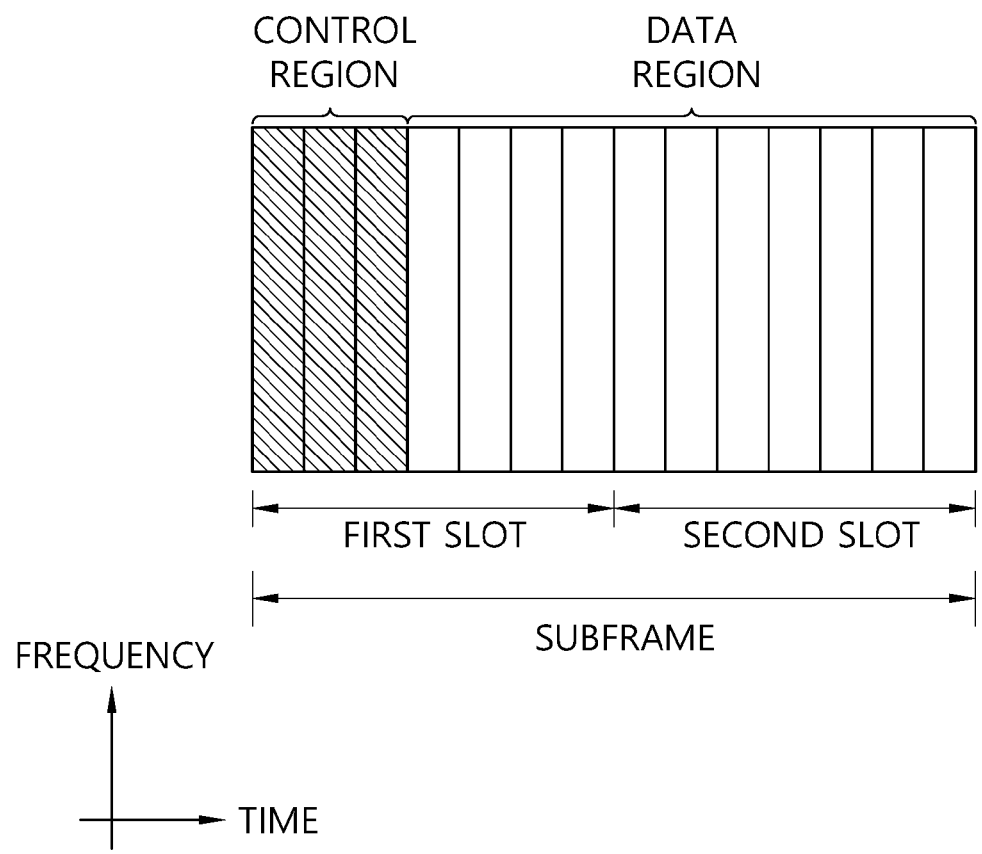

[Fig. 5]
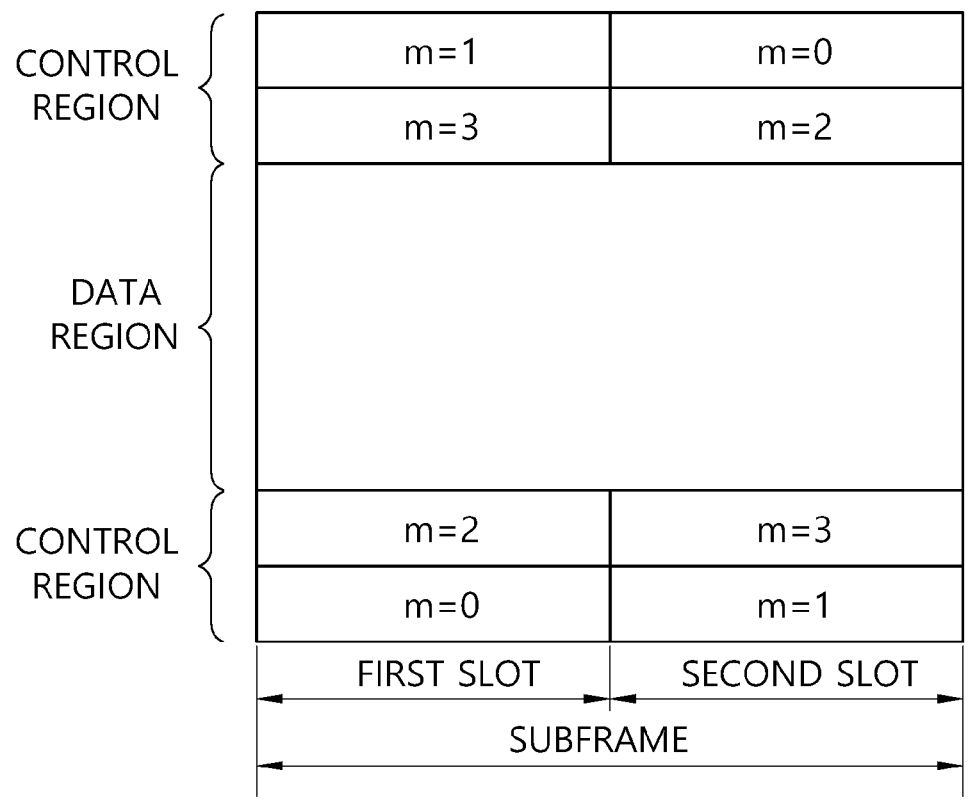

[Fig. 6]
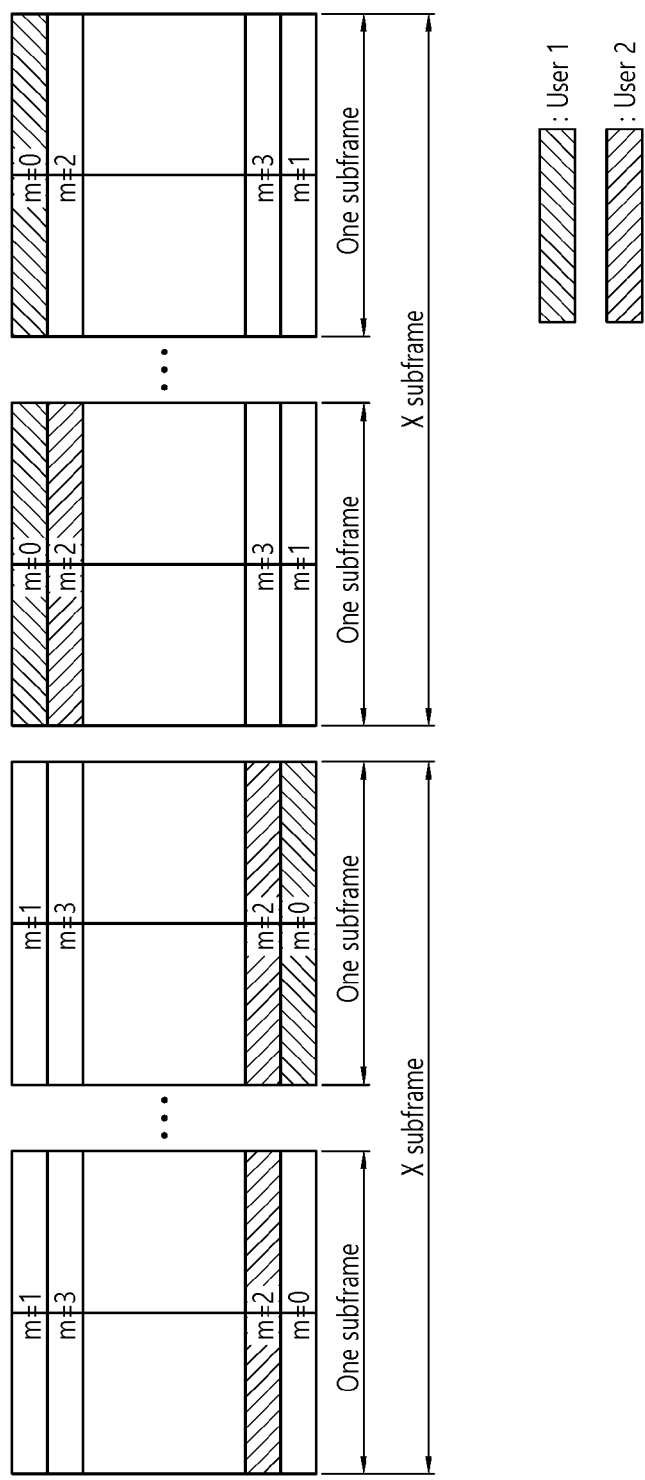

[Fig. 7]
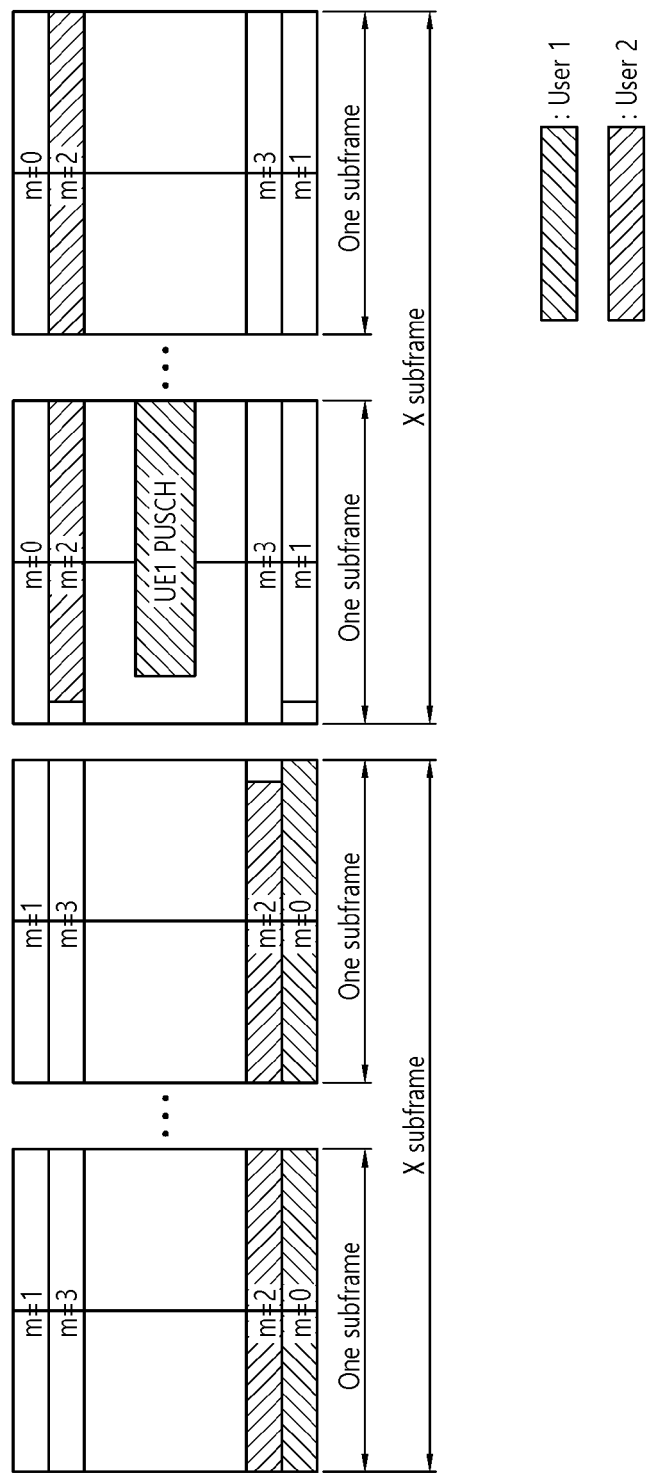

[Fig. 8]
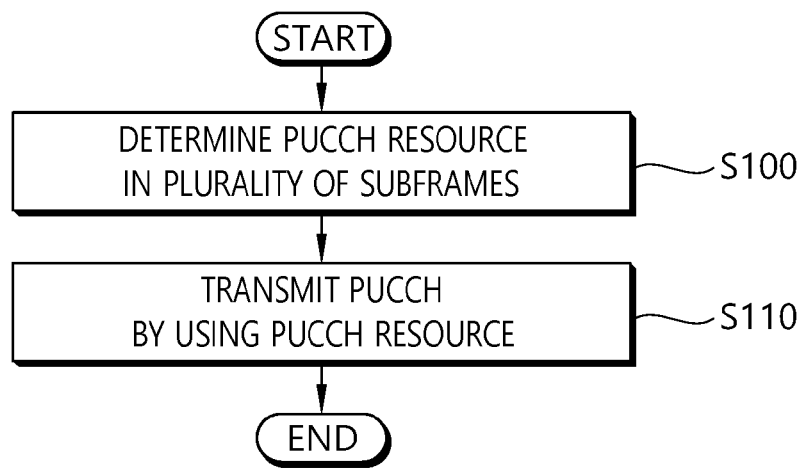

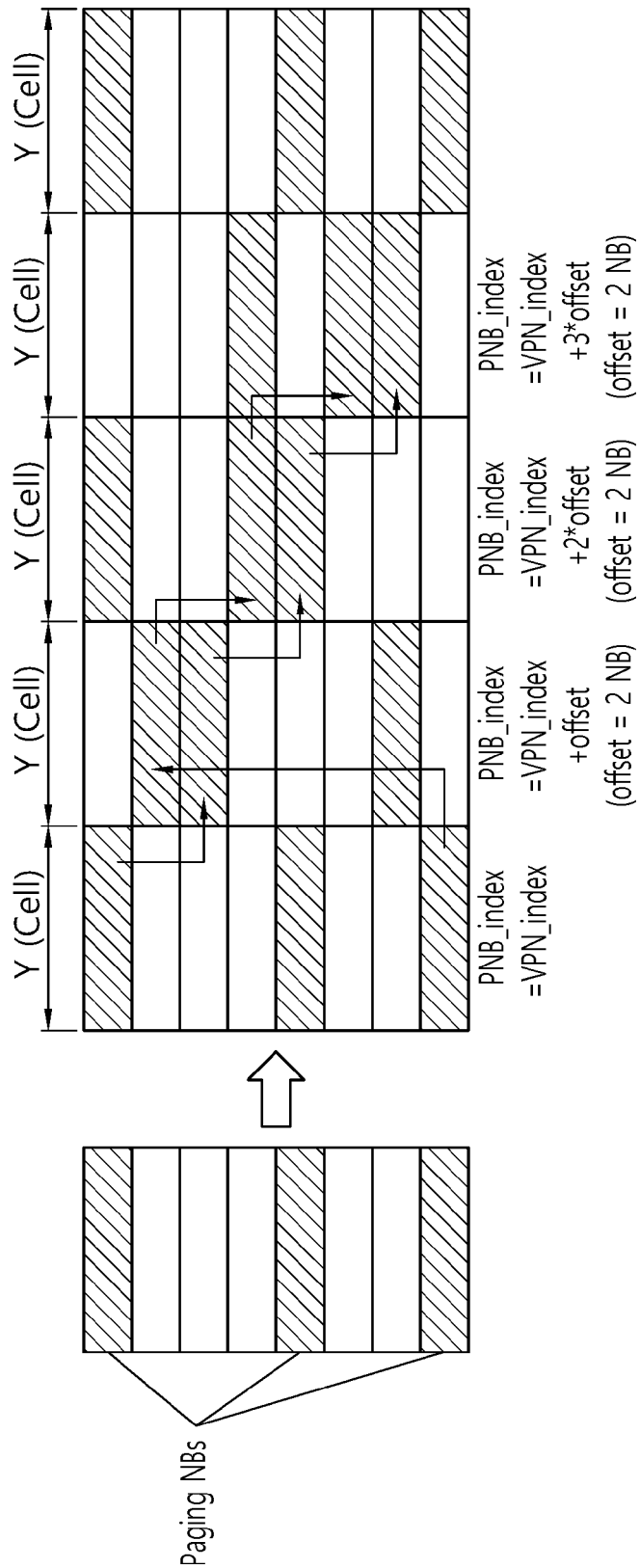
[Fig. 9]

[Fig. 10]
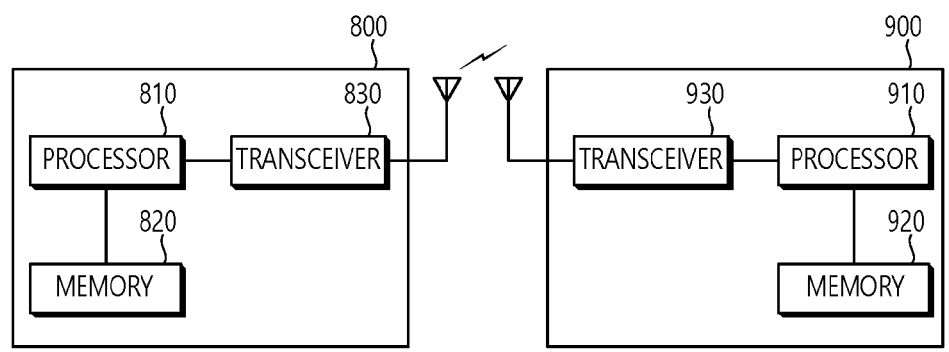

METHOD AND APPARATUS FOR HANDLING FREQUENCY RETUNING FOR MACHINE-TYPE COMMUNICATION USER EQUIPMENT IN WIRELESS COMMUNICATION SYSTEM

CROSS REFERENCE TO RELATED APPLICATIONS

This application is the National Phase of PCT International Application No. PCT/KR2016/012648, filed on Nov. 4, 2016, which claims priority under 35 U.S.C. 119(e) to U.S. Provisional Application No. 62/251,053, filed on Nov. 4, 2015, No. 62/252,384, filed on Nov. 6, 2015, and 62/256,733, filed on Nov. 18, 2015, all of which are hereby expressly incorporated by reference into the present application.

TECHNICAL FIELD

The present invention relates to wireless communications, and more particularly, to a method and apparatus for handling frequency retuning for a machine-type communication (MTC) user equipment (UE) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

As data traffic occurs occasionally rather than continuously for a MTC UE, regular measurement and reporting based channel estimation may not work very effectively. Moreover, once a MTC device has completed transmission of data, it is likely to go into sleep mode. Thus, it would be desirable to enable "one-time" reliable transmission rather than multiple transmissions based on acknowledgement/non-acknowledgement (ACK/NACK) process. Furthermore, it is expected that MTC devices will be installed in, e.g. basement, indoor, inside of buildings, etc., in which coverage may be limited. Thus, improving downlink and uplink coverage may be essential.

For the MTC UE, frequency hopping may be utilized. That is, frequency between transmissions may change. When the MTC UE needs to switch frequencies between transmissions, a method for handling frequency retuning effectively may be required.

DISCLOSURE OF INVENTION

Technical Problem

The present invention provides a method and apparatus for handling frequency retuning for a machine-type communication (MTC) user equipment (UE) in a wireless communication system. The present invention discusses mechanisms to handle a frequency retuning gap in case that a MTC UE needs to switch narrowbands between transmissions.

Solution to Problem

In an aspect, a method for transmitting a physical uplink control channel (PUCCH), by a machine-type communication (MTC) user equipment (UE), in a wireless communication system is provided. The method includes determining a PUCCH resource in a plurality of subframes, and transmitting the PUCCH by using the PUCCH resource to a network. The PUCCH resource is subject to frequency hopping across the plurality of subframes regardless of a number of repetition of PUCCH transmission and a starting subframe of the PUCCH transmission.

In another aspect, a machine-type communication (MTC) user equipment (UE) in a wireless communication system is provided. The MTC UE includes a memory, a transceiver, and a processor, coupled to the memory and the transceiver, that determines a PUCCH resource in a plurality of subframes, and controls the transceiver to transmit the PUCCH by using the PUCCH resource to a network. The PUCCH resource is subject to frequency hopping across the plurality of subframes regardless of a number of repetition of PUCCH transmission and a starting subframe of the PUCCH transmission.

Advantageous Effects of Invention

A frequency retuning gap can be handled effectively.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of frequency hopping of PUCCH transmission among different UEs with different starting subframes according to an embodiment of the present invention.
FIG. 7 shows another example of frequency hopping of PUCCH transmission among different UEs with different starting subframes according to an embodiment of the present invention.
FIG. 8 shows a method for transmitting a PUCCH by a MTC UE according to an embodiment of the present invention.
FIG. 9 shows an example of frequency hopping of paging according to an embodiment of the present invention.
FIG. 10 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared channel (PD- CCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of MTC UEs, reducing bandwidth is a very attractive option. To enable narrowband MTC UEs, the current LTE specification shall be changed to allow narrowband UE category. If the serving cell has small system bandwidth (smaller than or equal to bandwidth that narrow-band UE can support), the UE can attach based on the current LTE specification.

For example, a MTC UE may operate in reduced UE downlink and/or uplink bandwidth of 1.4 MHz (i.e. 6 PRBs), regardless of operating system bandwidth of a cell. A subband in which a MTC UE operates (i.e. MTC subband) may be located in a center of the system bandwidth (e.g. center 6 PRBs). Alternatively, multiple subbands in which multiples MTC UEs operates may be allocated in one subframe for multiplexing of the multiple MTC UEs. In this case, the multiple UEs may use different subbands from each other, or, may use the same subband (not center 6 PRBs).

Further, a MTC UE may operate in further reduced UE downlink and/or uplink bandwidth of 200 kHz (i.e. 1 PRB). The MTC UE may operate in a legacy cell which has a system bandwidth wider than 200 kHz with backward compatibility. This system may be referred to as in-band narrow-band (NB) LTE. Alternatively, the MTC UE may operate in a frequency, in which the legacy cell does not exist and only for the MTC UE. This system may be referred to as stand-alone LTE.

When the MTC UE operates in the reduced bandwidth, the MTC UE may not receive legacy PDCCH transmitted via whole system bandwidth. Further, it may not be desirable that a PDCCH for the MTC UE is received in OFDM symbols in which the legacy PDCCH is received due to multiplexing issues with PDCCH transmitted to another UE. Accordingly, a new physical DL control channel transmitted in a subband in which the MTC UE operates may be introduced for the MTC UE. The new physical DL control channel for the MTC UE (or, low-complexity UE) may be an existing enhanced PDCCH (EPDCCH) or may be a modified version of PDCCH/EPDCCH. Hereinafter, the new physical DL control channel may be referred to as an M-PDCCH (MTC-PDCCH).

Low complexity UEs are targeted to low-end (e.g. low average revenue per user, low data rate, delay tolerant) applications, e.g. some MTC. A low complexity UE has reduced Tx and Rx capabilities compared to other UE of different categories. Among low complexity UEs, a bandwidth reduced low complexity (BL) UE may operate in any LTE system bandwidth but with a limited channel bandwidth of 6 PRBs (corresponding to the maximum channel bandwidth available in a 1.4 MHz LTE system) in DL and UL. A BL UE may a transport block size (TBS) limited to 1000 bit for broadcast and unicast.

Coverage enhancement (CE) for the MTC UE is described. When a UE performs initial access towards a specific cell, the UE may receive master information block (MIB), SIB and/or RRC parameters for the specific cell from an eNB which controls the specific cell. Further, the UE may receive PDCCH/PDSCH from the eNB. In this case, the MTC UE should have broader coverage than the legacy UE. Accordingly, if the eNB transmits MIB/SIB/RRC parameters/PDCCH/PDSCH to the MTC UE with same scheme as the legacy UE, the MTC UE may have difficulty for receiving MIB/SIB/RRC parameters/PDCCH/PDCCH. To solve this problem, when the eNB transmits MIB/SIB/RRC parameters/PDCCH/PDSCH to the MTC UE having coverage issue, the eNB may apply various schemes for coverage enhancement, e.g. subframe repetition, subframe bundling, etc.

When a MTC UE having coverage issue uses the same service in the same cell with a legacy UE or a MTC UE not having coverage issue, a large amount of resources may be used to transmit data to the MTC UE having coverage issue. It may restrict services for other UEs. Therefore, in order to avoid the problem that an operation for the MTC UE having coverage issue may interference an operation for other UEs, a time region for the MTC UE having coverage issue and a time region for other UEs may be multiplexed by time division multiplexing (TDM). The time region for the MTC UE having coverage issue and time region for other UEs may be multiplexed with a long-term period, e.g. tens of minutes, or with a short-term period, e.g. some subframes.

In LTE-A, it has been discussed that repetition is applied to each channel for the MTC UE having coverage issue. That is, each channel may be transmitted with repetition for coverage enhancement of the MTC UE having coverage issue.

Hereinafter, a MTC UE, a UE requiring coverage enhancement (CE), a low cost UE, a low end UE, a low complexity UE, a narrow(er) band UE, a small(er) band UE, a new category UE, a BL UE, or narrowband internet-of-things (NB-IoT) UE, or NBLTE UE may have the same meaning, and may be used mixed. Or, just a UE may refer one of UEs described above. Further, in the description below, a case where system bandwidth of available cells is larger than bandwidth that new category narrow-band UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. In these cases, the UE may be able to receive only a limited number of PRBs or subcarriers. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

Hereinafter, various aspects regarding the MTC UE will be described according to embodiments of the present invention.

1. UL Frequency Retuning Gap Handling

When frequency hopping is used for transmission of the MTC UE, a frequency retuning gap is needed between transmissions. Generally, to preserve the orthogonality, PUCCH transmission should be protected as much as possible in terms of handling frequency retuning gap. How to handle the frequency retuning gap for PUCCH transmission, thus, may require the design of PUCCH transmission when different repetition levels of PUCCH transmission are multiplexed. In terms of supporting frequency hopping of PUCCH transmission with repetition, two approaches may be considered. The first approach is that frequency hopping for PUCCH transmission may apply in every X subframes, which then lead different frequency hopping occurrence per UE. The second approach is that frequency hopping of PUCCH transmission for different UEs may be aligned regardless of starting subframe of repetition. Accordingly, frequency hopping may occur simultaneously regardless of repetition number and starting subframe.

FIG. 6 shows an example of frequency hopping of PUCCH transmission among different UEs with different starting subframes according to an embodiment of the present invention. Referring to FIG. 6, frequency hopping of PUCCH transmission for UE1 and UE2 occurs at the same time, i.e. aligned. That is, frequency hopping of PUCCH transmission for UE1 and UE2 is aligned regardless of starting subframe of repetition and/or repetition number.

If this mechanism is used, it may also be applied to the case of R=1 (R is repetition number), where the physical resource may be different/determined based on subframe index or system frame number (SFN). If the first approach is used, the most suitable approach to handle frequency retuning latency in case of PUCCH transmission may be not to puncture any symbol during PUCCH transmission. For the first approach, when R=1, whether frequency hopping of PUCCH transmission is used or not may need to be clarified. However, to allow efficient multiplexing with other small number of repetitions, frequency hopping of PUCCH transmission may be used even when R=1. The hopping granularity may be larger than 1. Hopping granularity may be common among UEs which share the same PRB locations for PUCCH transmissions. To simplify the design, a cell-specific hopping granularity may be used for frequency hopping of PUCCH transmission. To avoid puncturing on PUCCH transmission, 1 ms gap may be allowed. However, this may change HARQ-ACK timing, particularly in case of no repetition or small repetition case.

If the second approach is used, since the frequency hopping patterns are aligned among UEs, the shortened PUCCH format may be used at the instance of frequency hopping. For example, if frequency hopping of PUCCH transmission occurs in every 5 ms, in subframe #4, a shortened PUCCH format in which the last symbol is punctured (end-shortened PUCCH format) may be used, and in subframe #5, a shortened PUCCH format in which the first symbol is punctured (start-shortened PUCCH format) may be used. For the start-shortened PUCCH format, the same mapping used in the second slot of legacy shortened PUCCH may be used.

In summary, frequency hopping of PUCCH transmission may be as follows.

PUCCH resource may be determined by a cell-specific frequency hopping pattern regardless of coverage level.
Frequency hopping of PUCCH transmission may occur in every (SFN*10+subframe index) % X=0 subframe, regardless of repetition number, starting subframe and/or invalid/valid subframe.

Frequency retuning at subframe n when frequency hopping of PUCCH transmission needs occur may be as follows in Table 1 below.

TABLE 1

| Subframe n-1 | Subframe n | Handling |
|---|---|---|
| PUSCH | PUCCH | Puncture last two symbols from subframe n-1 |
| PUSCH | PUSCH | Puncture one symbol from subframe n-1, and first symbol from n |
| PUSCH/ PUCCH | M-PDCCH/ PDSCH | In TDD, legacy PDCCH region is used. In HD-FDD, subframe n is a gap subframe |
| PUCCH | PUSCH | Puncture first two symbols from subframe n |
| PUCCH | PUCCH | When frequency hopping is aligned among UEs, end-shortened PUCCH is used in subframe n-1and, start-shortened PUCCH is used in subframe n. |
| M-PDCCH/ PDSCH | PUCCH/ PUSCH | In TDD, gap in special subframe is used. In HD-FDD, subframe n-1 is a gap subframe |

If the first approach is used, a UE may use end-shortened PUCCH format in subframe n−1 and start-shortened PUCCH format at subframe n, if it is configured to use shortened PUCCH format for frequency hopping. It may be up to the network to make it sure that PUCCH orthogonality can be managed. More particularly, this may be applied only for CE mode A, while in CE mode B, the last symbol from subframe n−1 and first symbol from subframe n may be punctured, whenever frequency retuning gap is needed, or not handled by other existing gaps or legacy PDCCH regions. Accordingly, repetition can absorb some impacts from orthogonality degradation. Alternatively, to handle PUCCH orthogonality, PUCCH transmission may be dropped in case of CE mode A and the frequency retuning gap may be needed so that it will not degrade the performance of other UEs. If PUCCH transmission is delayed due to frequency hopping, and there is another PUCCH transmission in the next subframe, aggregation of HARQ-ACK may be considered. Or, invalid subframes may be configured whenever frequency hopping is necessary (i.e. UE-automatic invalid subframe), and the invalid subframes may be skipped from repetition. In this case, the repetition number may be counted regardless of invalid subframes due to frequency retuning gap.

In this case, different UEs may use different shortened PUCCH formats. This may be an issue particularly with R=1 for PUCCH transmission. In order to maintain PUCCH orthogonality, one of the following approaches may be used.

In subframe n of SFN i where $((n+i*10) \% X)=0$, the UE may puncture the first symbol for PUCCH transmission. In subframe n−1, the UE may puncture the last OFDM symbol for PUCCH transmission. The first symbol of subframe n and the last symbol of subframe n−1 may be used for retuning between different UL narrowbands whenever necessary In subframe m of SFN i where $((m+i*10) \% X)$ is not zero, and if frequency retuning is necessary, the UE may take two symbols from PUSCH transmission. If frequency hopping occurs between two PUSCH transmissions, the UE may take one symbol from each PUSCH transmission.

Table 2 shows an example of frequency retuning at subframe n.

TABLE 2

| Subframe n-1 at SFN i | Subframe n at SFN i | Handling |
|---|---|---|
| PUSCH | PUCCH | If $((n + i*10) \% X = 0)$, puncture the last symbol of PUSCH and first symbol of PUCCH. Else: Puncture last two symbols from subframe n-1 |

TABLE 2-continued

| Subframe n-1 at SFN i | Subframe n at SFN i | Handling |
|---|---|---|
| PUSCH | PUSCH | Puncture one symbol from subframe n-1, and first symbol from n |
| PUSCH/ PUCCH | M-PDCCH/ PDSCH | In TDD, legacy PDCCH region is used. In HD-FDD, subframe n is a gap subframe |
| PUCCH | PUSCH | If $((n + i*10) \% X = X - 1)$, puncture the first symbol of PUSCH and last symbol of PUCCH. Else: Puncture first two symbols from subframe n |
| PUCCH | PUCCH | If $((n + i*10) \% X = 0)$, it is assumed that this is aligned among UEs. End-shortened PUCCH is used in subframe n-1, start-shortened PUCCH is used in subframe n. Else: Puncture last two symbols from subframe n-1 or Puncture first two symbols from subframe n Or, puncture PUCCH format 2 over PUCCH format 1 |
| M-PDCCH/ PDSCH | PUCCH/ PUSCH | In TDD, gap in special subframe is used. In HD-FDD, subframe n-1 is a gap subframe |

In other words, if frequency hopping of PUCCH transmission occur in every X subframes, shortened PUCCH format may be used in the instance of frequency hopping over two subframes. If one of subframe carries PUSCH transmission, one symbol from PUSCH transmission may be taken. In other cases, the UE may prioritize PUCCH transmission over PUSCH transmission and puncture PUSCH transmission up to two symbols. Between PUSCH transmissions, retuning gap may be taken evenly from two PUSCH transmissions (i.e. one symbol from each PUSCH transmission).

FIG. 7 shows another example of frequency hopping of PUCCH transmission among different UEs with different starting subframes according to an embodiment of the present invention. Referring to FIG. 7, in the instance of frequency hopping of PUCCH transmission, UE1 transmits PUCCH at subframe n−1 and PUSCH at subframe n. Accordingly, PUCCH transmission at subframe n−1 is maintained, and PUSCH transmission at subframe n is punctured at first two symbols. Further, UE2 transmits PUCCH at subframe n−1 and PUCCH at subframe n. Accordingly, PUCCH transmission at subframe n−1 is punctured at the last symbol (i.e. end-shortened PUCCH format), and PUCCH transmission at subframe n is punctured at the first symbol (i.e. start-shortened PUCCH format).

The embodiment of the present invention described above may be summarized as follows.

Shortened PUCCH format may be used in a predetermined pattern (per frequency hopping pattern)

The punctured symbol may be used for frequency retuning if necessary

If more symbol is necessary from PUSCH transmission, other symbol may be taken.

FIG. 8 shows a method for transmitting a PUCCH by a MTC UE according to an embodiment of the present invention. The present invention regarding frequency retuning gap described above may be applied to this embodiment.

In step S100, the MTC UE determines a PUCCH resource in a plurality of subframes. The PUCCH resource is subject to frequency hopping across the plurality of subframes regardless of a number of repetition of PUCCH transmission and a starting subframe of the PUCCH transmission. That is, the frequency hopping of PUCCH resources among different UEs is aligned. The frequency hopping may occur in every X subframes satisfying (SFN*10+subframe index) % X=0, where SFN denotes a system frame number. The PUCCH resource may be determined by a cell-specific frequency hopping pattern regardless of a coverage level.

The PUCCH resource corresponds to a shortened PUCCH format. A last symbol may be punctured in the shortened PUCCH format immediately before an instance of the frequency hopping. Or, a first symbol may be punctured in the shortened PUCCH format immediately after an instance of the frequency hopping. A punctured symbol in the shortened PUCCH format may be used as a frequency retuning gap.

In step S110, the MTC UE transmits the PUCCH by using the PUCCH resource to a network.

2. Handling of Positional Reference Signal (PRS)

In the current specification, a MTC UE is not expected to handle PRS and enhanced PDCCH (EPDCCH)/PDSCH simultaneously, and it is up to the network to handle the collision. Similarly for the MTC UE, for M-PDCCH/PDSCH repetition, if performance impact is expected to be considerable, the network may configure invalid subframe on potential PRS subframes to avoid transmission. If not, PRS may puncture M-PDCCH/PDSCH repetition which may lead performance degradation. In other words, PRS may puncture M-PDCCH/PDSCH repetition if eNB cannot avoid transmission of M-PDCCH/PDSCH repetition. In this case, a MTC UE may not be expected to receive PRS and M-PDCCH/PDSCH at the same subframe.

In terms of bitmap length, valid subframe should be able to signal normal subframe as invalid subframe. If only multicast-broadcast single-frequency network (MBSFN) subframe can be signaled, valid subframe signaling may be placed in SIB2 rather than SIB1 along with MBSFN configuration, and the bitmap size may be defined as the number of MBSFN subframe in a given period (i.e. depending on MBSFN configuration). If the bitmap size is a concern to cover 40 ms, the bitmap size may reduce to 20 bits to cover normal subframes as well as MBSFN subframes. In other words, 20 or 40 bits of valid subframe configuration covering both normal and MBSFN subframe may be signaled.

3. Time Offset Between Physical Channels

Legacy timing may be used for time offset between physical channels, e.g. between PDSCH and PUCCH, or between UL grant and PUSCH. In half-duplex FDD, relaxing of HARQ timing may benefit data rate. As half-duplex FDD is prioritized over full-duplex FDD, and relaxing of HARQ timing may help UE complexity as well, relaxation of k to 5 for timing offset may be considered. That is, k subframes between UL grant and PUSCH may be 4 or 5. When the number of subframes is counted for k, k may be counted regardless of invalid/valid UL subframes. In other words, in subframe n+4 or n+5, PUSCH or PUCCH may start regardless of how may invalid UL subframes exists between subframe n and subframe n+4/n+5. If any subframe including the first subframe is an invalid subframe, the transmission may be skipped if R>1. If R=1, it can override valid subframe configuration, i.e. PUSCH may be transmitted. To avoid data transmission in invalid subframe, the network may avoid collision via scheduling.

4. Measurement Gap

There are three types of measurements, i.e. serving cell measurement, intra-frequency measurements, and inter-frequency measurements. For serving cell measurement, unless it is required to read primary synchronization signal (PSS)/secondary synchronization signal (SSS), which may be done only in RRC_IDLE, measurement may occur in another narrowband. Particularly, serving cell measurement may be performed on narrowband(s) where M-PDCCH is monitored. For intra-frequency measurements, for normal or small coverage case, the current measurement gap may be reused. In a large coverage case, given that a UE needs to acquire more PSS/SSS to detect a cell in enhanced coverage, utilizing the current measurement gap may lead large latency in terms of cell detection, and may lead poor performance. However, it is not clear whether intra-frequency measurement on UEs of large coverage enhancement is needed when the UE is in RRC_CONNECED. A UE may tune to the center 6 PRBs while it is in RRC_IDLE for intra-frequency measurement. In other words, current measurement gap may be reused for UEs in CE mode A. Intra-frequency measurement in RRC_CONNECTED based on a measurement gap may not be supported for UEs in CE mode B.

5. Frequency Hopping of SIB1bis

Frequency hopping of SIB1 bis may occur between two narrowbands or four narrowbands depending on the system bandwidth. In both cases, some inter-cell randomization in terms of frequency/time resource of SIB1 bis may be beneficial. The narrowbands may be selected based on cell ID and system bandwidth. Randomizing the frequency location may have some impact on legacy UEs, since it may impact distributed virtual resource block (DVRB) resource allocation to legacy UEs. To minimize the impact on legacy UEs and maximize the frequency diversity gain, narrowbands may be placed in the edge of system bandwidth. To have inter-cell randomization, frequency hopping pattern may be randomized based on cell ID. If different narrowbands are selected based on cell ID, a simple frequency hopping mechanism (e.g. mirroring) can be used. In terms of frequency hopping function, which will be determined based on cell ID, subframe index/SFN, some alignment with other frequency hopping such as SIs, common data, unicast/broadcast need to be considered.

6. Frequency Hopping Function

Different hopping granularity may be used per coverage level, and disabling/enabling of frequency hopping may be UE-specific for unicast data/control. Further, cell-specific hopping granularity for M-PDCCH scheduling paging and CE-level cell-specific hopping granularity for random access response (RAR) may be used. In determining frequency hopping, how to apply frequency hopping needs to be clarified. Accordingly, frequency hopping may be applied in every X ms, regardless of valid/invalid subframes starting from the start of the transmission. For example, for M-PDCCH, starting subframe of M-PDCCH monitoring may be used for starting of frequency hopping. For PDSCH, the starting subframe may be determined based on scheduling mechanism and set of valid subframe.

If this is applied, it is possible that frequency hopping of one UE's M-PDCCH transmission may not be aligned with frequency hopping of the other UE's PDSCH in terms of frequency hopping occurrence. This may complicate the scheduling decision to avoid possible collision in consideration of repetition number of M-PDCCH, invalid subframe, etc. More specifically, M-PDCCH of UE3 may collide with PDSCH of UE2, unless the scheduler schedules PDSCH of UE2 in a different set of narrowbands or avoids collision carefully. Thus, some alignment is desired. For alignment, frequency hopping sequence may be aligned which may be a function of repetition number, subframe index/SFN similar to SFN. For example, instead that PDSCH of UE2 hops in every Ych ms starting from the starting subframe, PDSCH of UE2 may hop in every (SFN*10+subframe index) % Ych=0, regardless of valid/invalid subframes and starting subframe of transmission. If this is applied, potential collisions may be reduced as frequency hopping sequence is rather deterministic and not varied due to the set of invalid subframe or other factors. Further, different hopping granularity transmissions may not be multiplexed, since it may also potentially increase the collision probability among different granularity.

Further, in terms of minimum hopping granularity, as frequency hopping in every subframe may cause loosing of cell-specific reference signal (CRS) of two OFDM symbols in every subframe (and thus may affect channel estimation performance), the minimum hopping granularity Y may be 2.

7. Frequency Hopping of Various Channels

For PUCCH frequency hopping pattern, slot-hopping pattern may be expanded to subframe-hopping with some resource mapping change. In other words, symmetric hopping pattern can be used for frequency hopping of PUCCH.

For PUSCH/physical random access channel (PRACH) hopping pattern, an offset between two narrowbands may be semi-statically configured. It may be either cell-specific or UE-specific configuration. To allow flexibility, UE-specific offset may be considered which then added in addition to cell-specific offset. In other words, the location of another narrowband may be defined as (allocated narrowband+cell-specific-offset+ UE-specific-offset). For PRACH, CE-level specific offset may be used instead of UE-specific-offset. For PUSCH, CE-level specific offset may also be considered.

Frequency hopping of PRACH may be enabled per CE level, which may be configured in PRACH configuration. Unless configured otherwise, frequency hopping of PRACH may not be used. When frequency hopping of PRACH is enabled, per each PRACH resource, multiple PRACH resources may be configured. When frequency hopping of PRACH is enabled and multiple PRACH frequency resources are configured, a UE may select the initial PRACH resource similar to TDD case. What is different from TDD case is that frequency hopping of PRACH occurs in every M PRACH transmissions. Hopping granularity of M may can be also configured per PRACH resource. A default value may be the number of PRACH resource within two radio frames (i.e. 20 ms).

For frequency hopping pattern of Paging/RAR, the location of paging narrow-band or RAR M-PDCCH narrowband may be monitored according to frequency hopping pattern. To avoid potential complexity at the scheduler, virtual narrowband index for multiple paging narrowband or RAR M-PDCCH narrowband may be assigned, where physical narrowband may be determined based on the frequency hopping.

FIG. 9 shows an example of frequency hopping of paging according to an embodiment of the present invention. Frequency hopping sequence may be a function of configurable offset, subframe/SFN and hopping granularity of Y. For each configuration of narrowband for paging and RAR, virtual narrowband may be used if frequency hopping is enabled. Referring to FIG. 9, one example for frequency hopping sequence may follow Equation 1 below.

Physical NB location={Virtual NB location(configured NB index)+floor((SFN*10+subframe index)/Y(Cell))*hopping_offset(per hopping)}% number of NBs.     <Equation 1>

Further, instead of fixed offset, frequency hopping function may be used. In this case, PUCCH type 2 hopping function may be used. However, given that not many narrowbands are available in the system bandwidth, configurable offset may be sufficient for the hopping sequence.

8. Hopping Granularity Configuration

The potential number of repetitions for M-PDCCH may be one of {1, 2, 4, 8, 16, 32, 64, 128, 256}. For PDSCH/PUSCH, the repetition number may be increased to one of {1, 4, 8, 16, 32, 64, 128, 256, 512, 768, 1024}. Among these values, depending on the coverage level or CE mode, a subset of repetition levels may be configured/indicated to a UE. In terms of configuration of hopping granularity, two approaches may be considered. The first approach is configure Ych per a subset of repetition numbers and each channel may apply different hopping granularity per repetition number. In case of M-PDCCH, the maximum repetition number may be used to determine hopping granularity. The second approach is to configure Ych per PRACH coverage level and each UE determines Ych based on its PRACH coverage level, which then will be applied to all transmissions regardless of actual repetition level used. If the first approach is used, SIB may configure Ych value per range (starting repetition, end repetition level) depending on the used narrowbands for hopping. Table 3 shows an example of Ych configuration.

TABLE 3

| Starting repetition level | End repetition level | Y (in case of two narrowbands hopping) | Y (in case of four narrowbands hopping) |
|---|---|---|---|
| 1 | 8 | 2 | 2 |
| 16 | 64 | 10 | 5 |
| 128 | 256 | 20 | 10 |
| 512 | 1024 | 20 | 20 |

If the second approach is used, PRACH configuration may also include Ych value used per coverage level, or may be configured separately to map Ych value per coverage level.

Table 4 shows another example of Ych configuration. Table 4 shows corresponds to a case that a UE is configured with Ych per coverage level of each channel (i.e. no dynamic change of hopping granularity per transmission).

TABLE 4

| CE level | Min repetition number of M-PDCCH | Max repetition number of M-PDCCH | Min repetition number of M-PDSCH | Max repetition number of M-PDSCH | Repetition number of M-PUCCH | Min repetition number of M-PUSCH | Max repetition number of M-PUSCH | Y (two NB) | Y (four NB) |
|---|---|---|---|---|---|---|---|---|---|
| 0 | 1 | 4 | 1 | 8 | 1 | 1 | 8 | 2 | 2 |
| 1 | 4 | 16 | 16 | 64 | 4 | 16 | 64 | 4 | 2 |
| 2 | 16 | 64 | 64 | 256 | 16 | 64 | 256 | 10 | 5 |
| 3 | 32 | 128 | 128 | 1024 | 64 | 128 | 1024 | 20 | 10 |

CE level of each channel may be configured per UE after initial setup. In this case, hopping granularity may also change according to the configuration.

9. TDD Handing in Case of R>1 in CE Mode A

In TDD, when repetition number of PUCCH is greater than 1, the number of parallel HARQ processes needs to be determined not to have any collision. For example, if multiple PDSCHs are scheduled, it is possible to have some PUCCH collision among multiple PUCCH repetitions between first and second HARQ process. Since the collision may occur in the middle of repetition, it may become very challenging to handle the collision, since ACK-NACK bundling is not easily feasible. To avoid this potential collision, the network needs to avoid any scheduling which may lead PUCCH-PUCCH collision. This may restrict scheduling flexibility and also limit the use of multiple HARQ processes. At least for TDD DL/UL configuration 1, when PUCCH repetition number is 2, the maximum HARQ processes run in parallel may be limited by 2 to avoid any confusion.

In order to solve the problem above, HARQ-ACK timing of PDSCH may be redefined in TDD depending on the number of repetition used by PUCCH. For example, when R=1, legacy HARQ-ACK timing may be used. When R=2, HARQ-ACK timing may be redefined based on the number of UL subframes per radio frame. For example, when R=2 in TDD DL/UL configuration 1, since there are two UL subframes in every 5 ms, HARQ-ACK timing may be defined per two UL subframes rather than per each UL subframe. Table 5 shows an example of HARQ-ACK timing when R=2.

Alternatively, potential PUCCH-PUCCH collision may be allowed in TDD case, and the later PUCCH transmission may have higher priority. Accordingly, the network may still transmit DL data in any subframes without too much restriction.

Further, DL subframes corresponding to a set of UL resources may be grouped for non-collision PUCCH transmission. For example, set of DL subframes may be grouped to UL resource. ACK/NACK bundling on such DL subframes may always occur regardless of how many subframes used for DL transmission. In general, a set of UL subframes may be combined and a set of DL subframes may be mapped to it. For the mapping, UL resource in the first 5 ms of each radio frame may be mapped to a set of DL subframes before n−4 (n is the UL subframe) to n−11, if the total number of UL subframes in a radio frame is 2 and R=2. If the total number of UL subframes in a radio frame is 4 and R=2, each UL subframes in each 5 ms may correspond n−4 to n−13. If the total number of UL subframes in a radio frame is 6 and R=2, one UL subframe per each 5 ms may not be used, and follow the above rule. If the total number of UL subframes in a radio frame is 6 (or 4) and R=4, for UL subframe 2, mapping may correspond to n−4 to n−13 excluding UL subframes and other UL subframe may use the same mapping as UL subframe 2. If the total number of UL subframes in a radio frame is 2 and R=4, for UL subframe 2 in even radio frame, mapping may correspond to n−4 to n−23. If the total number of UL subframes in a radio frame is 2 and R=8, for UL subframe 2 in every SFN % 4=0, mapping may correspond to n−4 to n−43. In other words, the HARQ-ACK timing may change based on SFN, then there will be less

TABLE 5

| Subframe number | 0 | 1 | 2 | 3 | 4 | 5 | 6 | 7 | 8 | 9 |
|---|---|---|---|---|---|---|---|---|---|---|
| Config 0 | | | (6, 7) | Repetition of SF 2 | Not used | | | (6, 7) | Repetition of SF 6 | Not used |
| Config 1 | | | (4, 7, 8) | Repetition of SF 2 | | | | (4, 7, 8) | Repetition of SF 6 | |
| Config 2 | | | (6, 7, 8, 9, 11, 12, 13, 14) | | | | | Repetition of SF 2 | | |
| Config 3 | | | (4, 5, 6, 7, 11, 12, 13, 14) | Repetition of SF 2 | Not used | | | | | |
| Config 4 | | | (11, 12, 13, 14, 15, 16, 17) | Repetition of SF 2 | | | | | | |

For configuration 5, the HARQ-ACK timing may be expanded to 2 radio frames.

Table 6 shows an example of HARQ-ACK timing when R=4. In this case, HARQ-ACK timing may be expanded over four UL resources.

collisions. Accordingly, all TDD DL transmission may be freely scheduled without concerning ACK/NACK collision.

FIG. 10 shows a wireless communication system to implement an embodiment of the present invention.

TABLE 6

| Subframe number | 0 | 1 | 2 | 3 | 4 | 5 | 6 | 7 | 8 | 9 |
|---|---|---|---|---|---|---|---|---|---|---|
| Config 0 | | | (6, 7, 11, 12) | Repetition of SF 2 | Not used | | | Repetition of SF 2 | Repetition of SF 2 | Not used |
| Config 1 | | | (4, 7, 8, 9, 10, 11) | Repetition of SF 2 | | | | Repetition of SF 2 | Repetition of SF 2 | |
| Config 2 | | | (21, 22, 23, 24, 25, 27, 28) | | | | | Repetition of SF 2 | | |
| Config 3 | | | (21, 22, 23, 24, 25, 26, 27) | Repetition of SF 2 | Not used | | | | | |
| Config 4 | | | (21, 22, 23, 24, 25, 26, 27, 28) | Repetition of SF 2 | | | | | | |

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting a physical uplink control channel (PUCCH), by a machine-type communication (MTC) user equipment (UE), in a wireless communication system, the method comprising:
receiving a physical downlink shared channel (PDSCH) from a network in a first subframe, wherein other PDSCHs than the PDSCH are not received in the first subframe, and the PDSCH is repeated in first multiple subframes including the first subframe;
determining a PUCCH resource in a second subframe; and
transmitting the PUCCH as a response to the PDSCH based on the PUCCH resource to the network in the second subframe, wherein the PUCCH is repeated in second multiple subframes including the second subframe.

2. The method of claim 1, wherein the PUCCH resource is subject to frequency hopping across the second multiple subframes regardless of a number of repetition of PUCCH transmission and a starting subframe of the PUCCH transmission.

3. The method of claim 2, wherein the frequency hopping of PUCCH resources among different UEs is aligned.

4. The method of claim 1, wherein the PUCCH resource is determined by a cell-specific frequency hopping pattern regardless of a coverage level.

5. The method of claim 1, wherein the PUCCH resource is a resource for a shortened PUCCH format.

6. The method of claim 5, wherein a last symbol is punctured in the shortened PUCCH format immediately before an instance of frequency hopping.

7. The method of claim 5, wherein a first symbol is punctured in the shortened PUCCH format immediately after an instance of frequency hopping.

8. The method of claim 5, wherein a punctured symbol in the shortened PUCCH format is used as a frequency retuning gap.

9. A machine-type communication (MTC) user equipment (UE) in a wireless communication system, the MTC UE comprising:
a memory;
a transceiver; and
a processor, coupled to the memory and the transceiver,
wherein the transceiver is configured to receive a physical downlink shared channel (PDSCH) from a network in a first subframe, other PDSCHs than the PDSCH are not received in the first subframe, and the PDSCH is repeated in first multiple subframes including the first subframe,
wherein the processor is configured to determine a physical uplink control channel (PUCCH) resource in a second subframe, and
wherein the transceiver is configured to transmit a PUCCH as a response to the PDSCH based on the PUCCH resource to the network in the second subframe, wherein the PUCCH is repeated in second multiple subframes including the second subframe.

10. The MTC UE of claim 9, wherein the PUCCH resource is subject to frequency hopping across the second multiple subframes regardless of a number of repetition of PUCCH transmission and a starting subframe of the PUCCH transmission.

11. The MTC UE of claim 10, wherein the frequency hopping of PUCCH resources among different UEs is aligned.

12. The MTC UE of claim 9, wherein the PUCCH resource is determined by a cell-specific frequency hopping pattern regardless of a coverage level.

13. The MTC UE of claim 9, wherein the PUCCH resource is a resource for a shortened PUCCH format.

14. The MTC UE of claim 13, wherein a last symbol is punctured in the shortened PUCCH format immediately before an instance of frequency hopping.

15. The MTC UE of claim 13, wherein a first symbol is punctured in the shortened PUCCH format immediately after an instance of frequency hopping.

16. A processor for a machine-type communication (MTC) user equipment (UE) in a wireless communication system, wherein the processor is configured to:
control the MTC UE to receive a physical downlink shared channel (PDSCH) from a network in a first subframe, wherein other PDSCHs than the PDSCH are not received in the first subframe, and the PDSCH is repeated in first multiple subframes including the first subframe, determine a physical uplink control channel (PUCCH) resource in a second subframe, and control the MTC UE to transmit a PUCCH as a response to the PDSCH based on the PUCCH resource to the network in the second subframe, wherein the PUCCH is repeated in second multiple subframes including the second subframe.

* * * * *